(12) United States Patent
Szlag

(10) Patent No.: US 9,738,183 B2
(45) Date of Patent: Aug. 22, 2017

(54) TELESCOPIC COVER ELEMENT OF A RECEIVING DEVICE OF A VEHICLE SEAT

(71) Applicant: Volkswagen Aktiengesellschaft, Wolfsburg (DE)

(72) Inventor: Robert Szlag, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 135 days.

(21) Appl. No.: 14/969,740

(22) Filed: Dec. 15, 2015

(65) Prior Publication Data

US 2016/0101714 A1 Apr. 14, 2016

Related U.S. Application Data

(63) Continuation of application No. PCT/EP2014/059360, filed on May 7, 2014.

(30) Foreign Application Priority Data

Jun. 15, 2013 (DE) ........................ 10 2013 010 153

(51) Int. Cl.
*B60N 2/28* (2006.01)
*B60N 2/58* (2006.01)
*B60N 2/60* (2006.01)

(52) U.S. Cl.
CPC ............. *B60N 2/2893* (2013.01); *B60N 2/58* (2013.01); *B60N 2/6009* (2013.01)

(58) Field of Classification Search
USPC ............................... 297/452.38, 463.1, 463.2
See application file for complete search history.

(56) References Cited

U.S. PATENT DOCUMENTS 6,196,628 B1 3/2001 Goy et al.
6,206,465 B1 * 3/2001 Faust ....................... A47C 7/74
297/180.1
(Continued)

FOREIGN PATENT DOCUMENTS

CN 102328607 A 1/2012
DE 198 53 149 C1 3/2000
(Continued)

OTHER PUBLICATIONS

Chinese Office Action for Chinese Application No. 201480030195.2 dated Oct. 8, 2016 with English translation.

*Primary Examiner* — David E Allred
(74) *Attorney, Agent, or Firm* — Muncy, Geissler, Olds & Lowe, P.C.

(57) ABSTRACT

A receiving device on a vehicle seat for a holding element of a fastening system which has a receiving element of an equipment part to be fastened, which receiving element can be fixed on the holding element. The holding element is provided with a cover element having a cover opening. The receiving device has a holding part which is reversibly secured on the holding element. The cover element has a casing body which emerges from the cover opening and has cover-element slotted guides that are open with respect to the holding element within the casing body. The casing body of the cover element at least partially surrounds a body of the holding part, and the open side of the cover-element slotted guides of the cover element engages in the holding element whereby the cover element is mounted and is guided in a telescopically movable manner.

8 Claims, 2 Drawing Sheets

(56) References Cited

U.S. PATENT DOCUMENTS

| | | | |
|---|---|---|---|
| 6,846,012 B2 * | 1/2005 | Baskin | B60N 2/002 |
| | | | 280/735 |
| 6,935,687 B1 | 8/2005 | Gray et al. | |
| 7,789,462 B2 | 9/2010 | Glover et al. | |
| 8,727,449 B2 * | 5/2014 | Laframboise | A47C 31/00 |
| | | | 297/463.2 |
| 9,061,619 B2 | 6/2015 | Mantke et al. | |
| 2004/0256877 A1 * | 12/2004 | Tromblee | B60R 22/18 |
| | | | 296/68.1 |
| 2008/0111411 A1 | 5/2008 | Glover et al. | |

FOREIGN PATENT DOCUMENTS

| | | | |
|---|---|---|---|
| DE | 100 44 621 C1 | 2/2002 | |
| DE | 102 06 780 A1 | 9/2003 | |
| DE | 10 2004 048 358 A1 | 4/2006 | |
| DE | 602 11 934 T2 | 1/2007 | |
| DE | 60 2005 006 028 T2 | 5/2009 | |
| DE | 10 2009 036 726 A1 | 2/2011 | |
| DE | 10 2011 002 045 A1 | 2/2012 | |
| JP | 2001-277920 A | 10/2001 | |
| JP | 2001-354058 A | 12/2001 | |
| JP | 2013060124 A * | 4/2013 | B60N 2/58 |
| WO | WO 03/010024 A2 | 2/2003 | |

* cited by examiner

TELESCOPIC COVER ELEMENT OF A RECEIVING DEVICE OF A VEHICLE SEAT

This nonprovisional application is a continuation of International Application No. PCT/EP2014/059360, which was filed on May 7, 2014, and which claims priority to German Patent Application No. 10 2013 010 153.0, which was filed in Germany on Jun. 15, 2013, and which are both herein incorporated by reference.

BACKGROUND OF THE INVENTION

Field of the Invention

The invention relates to a receiving device, in particular on a vehicle seat. The receiving device accommodates a receiving element of a fastening system, in particular an ISOFIX fastening system. The fastening system comprises a holding element, for example, an ISOFIX holding clip. The receiving element is fixable on the holding element. The receiving element is, for example, part of a piece of equipment to be fastened, for example, a child seat. According to the prior art, the holding element is provided with a cover element having a cover opening.

Description of the Background Art

The ISOFIX fastening system is a known, particularly secure and easy to operate fastening system, which is used, in particular, to fasten child seats in a motor vehicle. In this fastening system, a rigid connection between the structure and the object is established in a position of use between a structurally fixed holding clip (holding element) and an object to be fastened (child seat), whose receiving element—usually a latching element—engages with the structurally fixed holding clip.

If the ISOFIX fastening system is used to fasten a child seat, the holding clip is fastened, for example, on the structure side of the vehicle body or the vehicle seat structure, and the latching element is disposed on the structure of the child seat.

Different ISOFIX arrangements are known from the publications DE 10 2004 048 358 A1 and DE 100 44 321 C1.

The publication DE 10 2009 036 726 A1 describes a cover on an ISOFIX connection, which complies with DIN standard 13216, including a flap which is displaced in the position of use, in which the ISOFIX connection is locked.

The publication DE 102 06 7801 A1 describes a vehicle seat in a motor vehicle. The vehicle seat includes a backrest and a seat cushion. A slot is formed between the backrest and the seat cushion, where the backrest and the seat cushion border each other. A fastening apparatus according to the invention is attached to the vehicle seat in the area of this slot. This fastening apparatus includes two fastening elements, which are spaced a distance apart in the longitudinal direction of the slot. These fastening elements are each designed as a U-shaped holding clip and are adjustable from a position of use to a position of non-use or a parked position. In the position of use, the two fastening elements pass through the slot between the backrest and the seat cushion and project into a seat area of the vehicle seat. In their position of use, the two fastening elements are thus easily accessible, for example to anchor a child seat, which is not shown here, to the fastening elements.

This approach has the advantage that the holding clips are not visible on the position of non-use. However, it will be required in the future for the ISOFIX holding clips to be visible even in the position of non-use, so that, to improve safety, a signaling of the presence and the position of the ISOFIX holding clip within the vehicle seat is ensured.

To improve practicality, it is furthermore required that the attachment of objects, in particular child seats, to the ISO-FIX holding clip be possible without any measures for transferring the ISOFIX holding clip from the position of non-use to the position of use, as is necessary, for example, in the approach in the publication DE 102 06 7801 A1.

SUMMARY OF THE INVENTION

It is therefore an object of the invention to provide a device which always ensures a signaling of the position of at least one structurally fixed holding element (ISOFIX holding clip) of a fastening system, in particular of an ISOFIX fastening system, the at least one holding element of the fastening device also being disposed on the vehicle seat in a manner which is comfortable for the user.

In an exemplary embodiment of the invention a receiving device is provided that is disposed, for example, on a vehicle seat. The receiving device can be disposed in the area of a holding element of a fastening system. The fastening system comprises a receiving element of a piece of equipment to be fastened, which is fixable on the holding element, in particular an ISOFIX holding clip. The piece of equipment is, for example, a child seat, which includes the receiving element. The holding element of the fastening system can be provided with a cover element, which has a cover opening through which the receiving element is guided when a fastening of the receiving element, and thus the child seat, takes place on the holding element, the holding element being suitably structurally fixedly connected to the vehicle seat or the body of a vehicle.

According to an embodiment of the invention, it is provided that the receiving device can comprise, in addition to the cover element, a holding part which is reversibly secured on the holding element. The cover element includes a casing body which emerges from the cover opening and has cover element slotted guides, which are open with respect to the holding element, within the casing body, the casing body of the cover element at least partially surrounding a body of the holding part, and the cover element slotted guides of the cover element engaging with the holding element on their open side.

As a result, the cover element is advantageously supported on the holding part and guided in a telescopically movable manner with respect to the holding element via the cover element slotted guides and the enclosure of the casing body. An advantage of the receiving device lies in its simple structure, which is explained in greater detail below. Another advantage lies in the simple functionality of the receiving device, as is also explained in greater detail below. The receiving device is also advantageously easy to mount, only a small use of material being needed for its manufacture. The arrangement of the cover element, which always remains visible in the installed state, allows markings, for example, pictographs, to be attached, as is also explained in greater detail below. Due to markings of this type, it is advantageously possible to signal the position of the receiving device, whereby, in addition to improving comfort, required safety aspects may advantageously be implemented.

In an embodiment of the invention, it is provided that the holding part has open holding part slotted guides on its body, whereby the holding part may be pushed onto the holding element via the open side of the holding part slotted guides, whereby the holding part can be reversibly secured true to position on the holding element via latch openings disposed on the ends of the holding part slotted guides and positioning tabs disposed on the holding part.

Due to this design, the holding part is easy to mount and, on the whole, has a simple structure, the body of the holding part being matched in terms of its shape with the casing body of the cover element, as is explained in greater detail in the description.

In an embodiment of the invention, the cover element has a cover collar, which is disposed in the casing body of the cover element on a front side of the casing body of the cover element opposite the open side of the cover element slotted guides. The cover collar advantageously permits the arrangement of markings, since the surface of the cover collar is always visible within the surface of the vehicle seat. In addition, the cover collar becomes particularly important with respect to functionality, as is explained in greater detail in the description.

In order for the receiving element, for example the receiving element of a child seat, to be guided true to position to the holding element when the receiving element of the child seat is inserted into the cover element and fastened to the holding element, it is provided according to an embodiment of the invention that the casing body of the cover element forms a straight shaft or is designed in the manner of a funnel, so that the receiving element engages or latches with the holding element without problems.

The functionality of the receiving device is connected to the object in which the receiving device is installed, a vehicle seat being used below to explain the functionality. The telescoping capability of the receiving device arises from the aforementioned technical features, the movement of the cover element from one position to the other taking place as follows. The cover element is situated in a first position in a provision and use situation. In this provision and use situation, the cover element is without load, i.e., no external force acts upon the cover element.

In this provision and use situation, the holding element engages with a particular, predefinable first position in the cover element slotted guides.

The load can be applied to the cover element by a person sitting on the vehicle seat, the so-called seated position. An external force, which can be applied by the seated person, results in the loaded cover element, which assumes a second position in which the holding element engages with the cover element slotted guides of the cover element according to the second position.

In an embodiment of the invention, the cover element, together with the holding part, can be disposed in a recess of a foam which can be disposed on the structure of the vehicle seat, i.e., on the structure of the backrest part and the seat part. The arrangement of the cover element, together with the cover collar, takes place in such a way that the cover collar of the cover element, whose back rests in a planar manner on the surface of the foam, which is designed as a contact surface, while the front side of the cover collar of the cover element is oriented toward a person sitting on the vehicle seat.

A covering of the backrest part or the seat part can be disposed between the foam and the back side of the cover element.

This arrangement advantageously results from the function of the receiving device, namely that the unloaded cover element can be held in the first position, due to the foam disposed on the structure, in particular the structure of the backrest part of the vehicle seat, since the cover element is held in the first position via the foam pressure acting upon the back of the cover collar of the cover element.

Conversely, this cover element can be placed into the second position by overcoming the foam pressure acting upon the back of the cover collar of the cover element when a person sits on the vehicle seat and acts upon the front side of the cover collar of the cover element with his body, in particular with the back of his body, thereby overcoming the foam pressure.

It is advantageous that the telescoping capability is not produced by additional mechanical or necessary driving components but that the external force is applied by the seated person, whereby the simple design of the receiving device is facilitated, which essentially includes only two easy-to-mount parts.

The invention is explained below. For the purposes of the present description, the normal direction of travel of a vehicle is designated by "+x" ("plus x"), the direction opposite its normal direction of travel is designated by "−x" ("minus x"), the direction on the horizontal transversely to the x direction is designated by "y", and the direction on the vertical transversely to the x direction is designated by "z." This way of designating the spatial directions in terms of Cartesian coordinates corresponds to the coordinate system generally used in the automotive industry. In the figures, the same reference numerals are used in the following for the same components, if necessary not all previously introduced components being explained once again on the basis of the reference numerals in each figure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
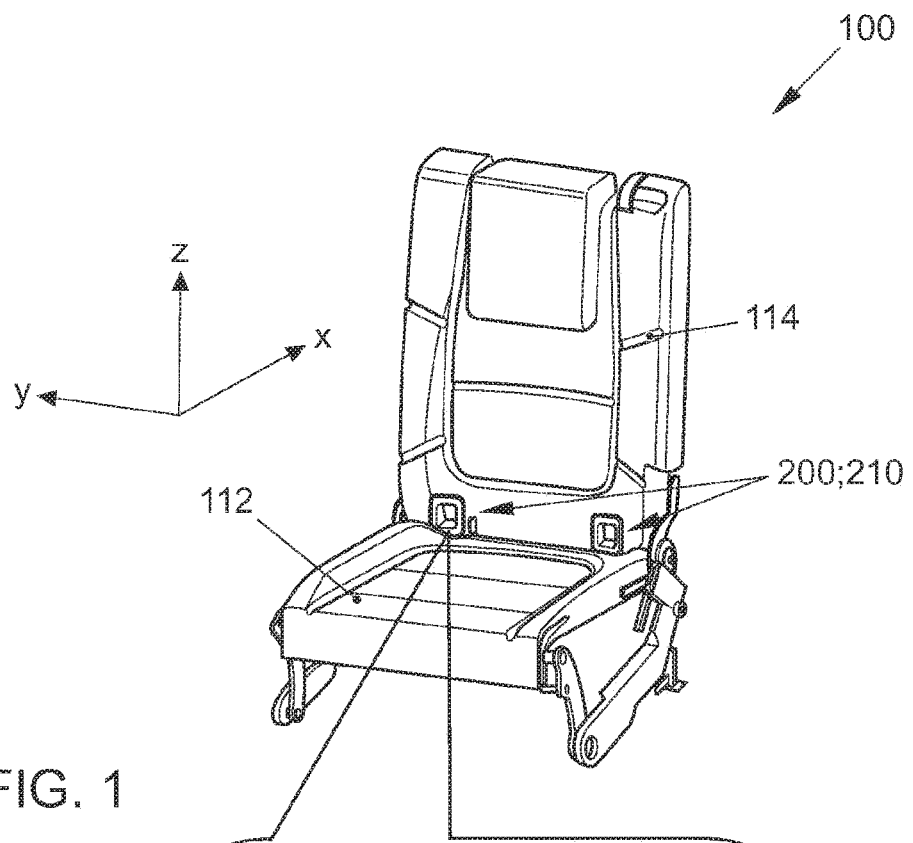
FIG. 1 shows a perspective representation of a vehicle seat, including two receiving devices disposed side by side in the installed state.

FIG. 1 shows a vehicle seat 100, which comprises a seat part 112 and a backrest part 114. In the perspective representation, the foam usually disposed on the structure is illustrated on the structure of seat part 112 and backrest part 114.

In the exemplary embodiment, a receiving device 200 is disposed in a recess 114A of the foam of backrest part 114.

In the exemplary embodiment, a rectangular cross section is provided as recess 114A. Recess 114A thus forms a shaft in the foam, through which the access to a holding element 300 of a fastening device is ensured.

Holding element 300 is, for example, an ISOFIX holding clip. It is hereby noted that holding element 300, which is structurally fixed, i.e., fixed to the vehicle body or to the structure of backrest part 114 or seat part 112, may be rigidly or flexibly disposed on the structure. A child seat is normally fastened to two of holding elements 300 according to the arrangement shown in FIG. 3. Holding elements 300 are positioned side-by-side at a predefinable distance from each other, viewed in the y direction. In most vehicles, however, holding elements 300 are ISOFIX holding clips.

The counterpart of the fastening device, namely a receiving element or two receiving elements, which is/are disposed, for example, on a child seat which is not illustrated in greater detail, complete the fastening device. The receiving element(s) is/are not shown in the figures.

FIG. 1 makes it clear that receiving device 200 according to the invention comprises a cover element 210.

Figure 2:
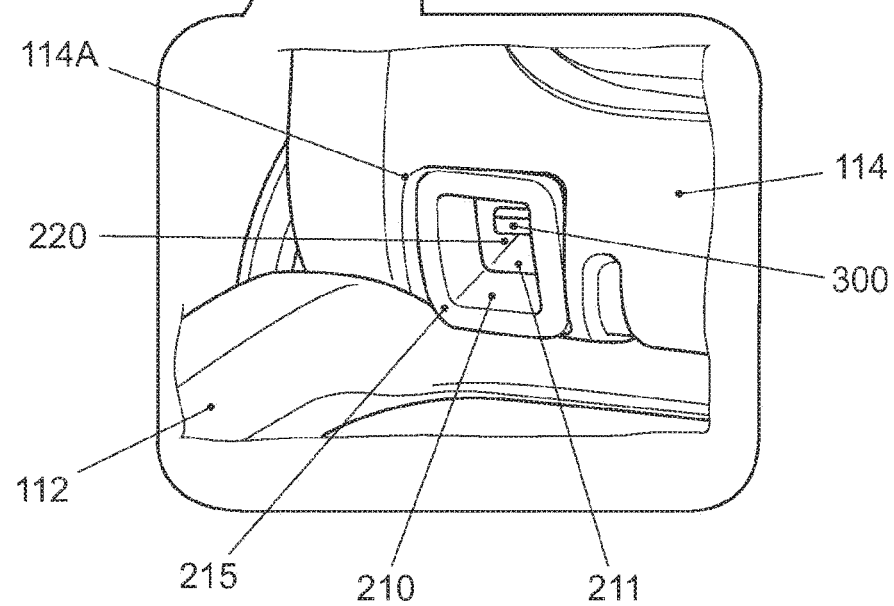
FIG. 2 shows an enlarged representation of one of the receiving devices according to FIG. 1.

In the enlarged representation of one of the two receiving devices 200 in FIG. 2, it is apparent that receiving device 200 comprises, in addition to cover element 210, a holding part 220, which is at least partially covered by cover element 210 in FIG. 2.

Recess 114A, which has an essentially rectangular cross section in the exemplary embodiment, accommodates holding part 220 and cover element 210 in the installed state, it being apparent in FIG. 2 that a casing body 212 also has a rectangular cross section, the casing body in the exemplary embodiment having a straight shaft which forms cover opening 211 of cover element 210.

FIG. 2 furthermore clarifies the fact that cover element 210 is disposed in backrest part 114 above seat part 112. Receiving device 200 is thus positioned a short distance above the transition area between seat part 112 and backrest part 114 in the foam of the backrest part.

In FIG. 2, receiving device 200 is situated in a first position a in the provision and use situation.

In this first position a, the back of a cover collar 215 of cover element 210 rests on the front surface of a foam of backrest part 114 and covers the edges of recess 114A. This arrangement results in a cleaner transition between the foam, or the covering disposed on the foam, and recess 114A.

In the provision and use situation, a force is not applied to cover element 210 from the outside. In this provision and use situation, the front surface of the cover element is thus on a plane with the surface of backrest part 114 provided with the foam and the covering.

Figure 3:
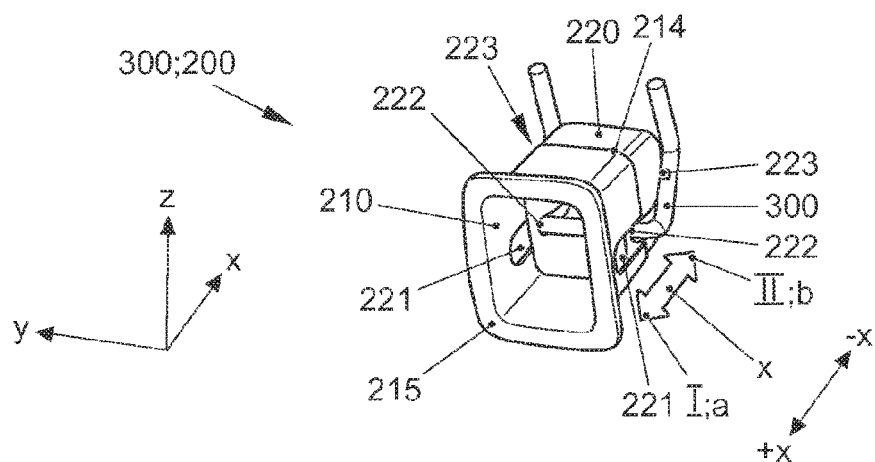
FIG. 3 shows an enlarged representation of the receiving device and a holding element of a fastening device for illustrating the telescoping capability of a cover element with respect to a holding part.

FIG. 3 shows an enlarged representation of this situation. Receiving device 200 comprises holding part 220 and cover element 210.

Cover element 210 is in first position a in FIG. 3.

Cover element 210 is telescopically movable in −x direction into a second position b, as indicated by the arrow in FIG. 3.

The movability of cover element 210 in the −x direction is reversible, so that the movement of cover element 210 may take place in the +x direction.

Holding part 220 is disposed on holding element 300.

In the exemplary embodiment, holding part 220 also has a rectangular body, the outer contour of the body corresponding to the inner contour of casing body 212 of cover element 210. Casing body 212 of cover element 210 thus forms an enclosure 214, which ensures that casing body 212 of cover element 210 is movably supported on the body of holding part 220. Holding part 220 has open holding part slotted guides 221 in its body.

In the installed state, holding part 220 is pushed onto holding element 300 via the open side of holding part slotted guides 221. Latching openings 222 are formed on the ends of holding part slotted guides 221, with which holding element 300 engaged, whereby holding part 220 is secured true to position on holding element 300. Positioning tabs 223 are also disposed on the body of holding part 220, whereby holding part 220 also comes to rest on holding element 300 and is thus disposed in a stabilized manner on holding element 300. As is made clear in FIG. 3, two positioning tabs 223 are oppositely disposed on the body of holding part 220, viewed in the y direction.

It is made clear in FIG. 3 that receiving device 200 has a modular design and comprises two essential components, namely holding part 220 and cover element 210.

Figure 4:
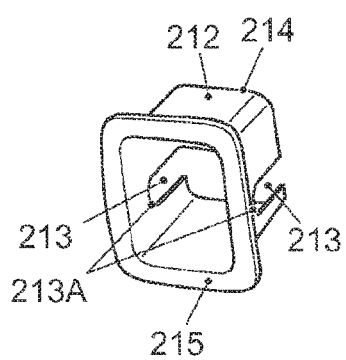
FIG. 4 shows an enlarged perspective individual representation of the cover element of the receiving device.

FIG. 4 shows an enlarged perspective individual representation of cover element 210 of the receiving device. Cover element slotted guides 213 have an open side, while opposite side forms a stop 213A. Enclosure 214 of casing body 212, which surrounds the body of holding part 220, is also visible.

Figure 5:
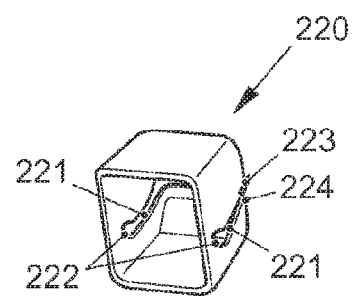
FIG. 5 shows an enlarged perspective individual representation of the holding element of the receiving device.

FIG. 5 shows holding part 220 in an enlarged perspective individual representation. Holding part slotted guides 221 and latching openings 222 are visible. The lower part of the body of holding part 220 is bent upward in the x direction, starting from the conventional installation of a vehicle seat 100 in a kind of cover part 224 of holding part 220, whereby a viewer is unable to see through the open shaft formed by the body of holding part 220 and casing body 212 of cover element 210, when looking obliquely from above onto receiving device 200. It is apparent that holding part slotted guides 221 are thereby provided with a semi-circular design.

Figure 6:
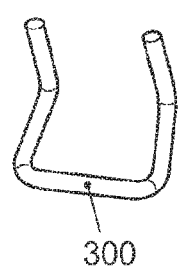
FIG. 6 shows an enlarged perspective individual representation of the holding element of the fastening device.

During the installation of the receiving device, holding part 220 is first engaged with latching openings 222 via holding part slotted guides 221 on holding element 200, which is shown in FIG. 6, the latching openings simultaneously performing the function of a stop.

Holding element 300, in particular the ISOFIX holding clip in its U-shaped design, is shown in an individual representation in FIG. 6.

The installation of holding part 220 is followed by the installation of cover element 210, the part of the ISOFIX holding clip running in the y direction in the exemplary embodiment, engaging with opposite cover element slotted guides 213 in the y direction. Stops 213A, which are disposed opposite the open side of cover element slotted guides 213, are formed by the closed side of cover element slotted guides 213A.

During the installation of cover element 210, first position a results from the fact that the back of cover collar 215 comes into contact with the foam or the foam of backrest part 114 provided with a covering on the front surface of backrest part 114.

As illustrated, holding element 200 according to FIG. 3 engages with cover element slotted guides 213 of unloaded cover element 210 in first position a in provision and use situation I of receiving device 200, and engages with cover element slotted guides 213 of cover element 210, which is loaded by a person, in a second position b in seated position II, in which the person, who is not illustrated, is sitting on vehicle seat 100.

The unloaded cover element is held in first position a by the foam disposed on the structure, in particular the structure of backrest part 114 of vehicle seat 100, since cover element 210 is pressed into first position a via the foam pressure acting upon the back of cover collar 215 of cover element 210.

The loaded cover element is placed into second position b by overcoming the foam pressure acting upon the back of cover collar 215 of cover element 210 when a person sits on vehicle seat 100 and applies an external force to the front side of cover collar 215 of cover element 210 with his body, thereby overcoming the foam pressure.

In summary, cover element 210 also moves when a person sits down (use situation of vehicle seat 100) and is thus not disposed rigidly or in a fixed position on backrest part 114 and/or seat part 112. In the use situation of vehicle seat 100, cover element 210 therefore increases comfort and is never a disturbing element for the seated person.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A receiving device on a vehicle seat comprising:
a holding element of a fastening system, the fastening system including a receiving element of a piece of equipment or a child seat, which is fixable to the holding element, wherein the holding element is fixed to the vehicle seat either directly or via structure in a vehicle in which the seat is located;
a holding part having an inner body of a telescoping pair of bodies, the inner body comprising open holding part slotted guides reversibly secured on the holding element, wherein the slotted guides extend longitudinally in a sliding direction; and
a cover element for the holding element, the cover element having a cover opening, the cover element having an outer body of the telescoping pair of bodies configured as a casing body that extends from the cover opening and includes cover element slotted guides extending longitudinally in the sliding direction within the casing body that are open with respect to the holding element, the casing body of the cover element at least partially surrounding the inner body of the holding part, the cover element slotted guides of the cover element being adapted to engage with the holding element on an open side of the cover element slotted guides,
wherein the cover element is supported and movably guided in a telescopic manner with respect to the holding part via the cover element slotted guides and the enclosure of the casing element on the holding part.

2. The vehicle seat according to claim 1, wherein the holding part is adapted to be pushed onto the holding element via an open side of the holding part slotted guides, and wherein the holding part is reversibly secured true to position on the holding element via latching openings disposed on an end of the holding part slotted guides and positioning tabs disposed on the holding part.

3. The vehicle seat according to claim 1, wherein the cover element has a cover collar that is disposed on the casing body of the cover element on a front side of the casing body of the cover element opposite an open side of the cover element slotted guides.

4. The vehicle seat according to claim 1, wherein the casing body of the cover element has a shape of a straight shaft or a funnel.

5. A vehicle seat comprising:
a receiving device for a holding element of a fastening system, which comprises a receiving element of a piece of equipment or a child seat, which is fixable on the holding element, wherein the holding element is fixed to the vehicle seat either directly or via structure in a vehicle in which the seat is located, the receiving device comprising:
a holding part having an inner body of a telescoping pair of bodies, the inner body comprising open holding part slotted guides reversibly secured on the holding element, wherein the slotted guides extend longitudinally in a sliding direction;
a cover element having a cover opening and an outer body of the telescoping pair of bodies configured as a casing body extending from the cover opening; and
cover element slotted guides extending longitudinally in the sliding direction within the casing body that are open with respect to the holding element, the casing body of the cover element at least partially surrounding the inner body of the holding part, and the cover element slotted guides of the cover element engaging with the holding element on an open side of the cover element slotted guides, wherein the cover element is supported and movably guided in a telescopic manner with respect to the holding part via the cover element slotted guides and an enclosure of the casing element on the holding part,
wherein the holding element engages with the cover element slotted guides of the cover element in an unloaded configuration in a first position in a provision and use situation of the receiving device, and engages with the cover element slotted guides of the cover element loaded by a person in a second position in a seated position, in which the person is seated on the vehicle seat.

6. The vehicle seat according to claim 5, wherein the cover element, together with the holding part, is disposed in a recess of a foam, a back of a cover collar of the cover element resting in a planar manner on a surface of the foam, which is designed as a contact surface, while a front side of the cover collar of the cover element is adapted to face toward a person siting on the vehicle seat.

7. The vehicle seat according to claim 5, wherein the unloaded cover element is held in the first position by the foam disposed on a structure of a backrest part of the vehicle seat, when the cover element is held in the first position by a foam pressure acting upon a back of a cover collar of the cover element.

8. The vehicle seat according to claim 5, wherein the loaded cover element is placed into the second position by overcoming a foam pressure acting upon a back of a cover collar of the cover element when a person sits on the vehicle seat and acts upon a front side of the cover collar of the cover element with his body, thereby overcoming the foam pressure.

* * * * *